US009258125B2

(12) United States Patent
Bunter et al.

(10) Patent No.: US 9,258,125 B2
(45) Date of Patent: Feb. 9, 2016

(54) GENERATING EVIDENCE OF WEB SERVICES TRANSACTIONS

(75) Inventors: Paul R. Bunter, San Diego, CA (US);
Ralph A. Hertlein, Alpharetta, GA (US);
Sreedhar Janaswamy, Bangalore (IN);
Rania Y. Khalaf, Cambridge, MA (US);
Keeranoor G. Kumar, Randolph, NJ (US); Michael McIntosh, Clifton, NJ (US); Anthony J. Nadalin, Austin, TX (US); Shishir Saxena, Ghaziabad (IN);
Ralph P. Williams, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 2153 days.

(21) Appl. No.: 11/245,310

(22) Filed: Oct. 6, 2005

(65) Prior Publication Data
US 2007/0083761 A1 Apr. 12, 2007

(51) Int. Cl.
*H04L 9/32* (2006.01)
*H04L 29/06* (2006.01)

(52) U.S. Cl.
CPC .............. *H04L 9/3247* (2013.01); *H04L 63/12* (2013.01); *H04L 2209/56* (2013.01); *H04L 2209/60* (2013.01); *H04L 2209/68* (2013.01); *H04L 2209/80* (2013.01)

(58) Field of Classification Search
CPC ... H04L 63/12; H04L 9/3247; H04L 2209/68; H04L 2209/56; H04L 2209/60; H04L 2209/80
USPC .......................... 380/276, 277, 278, 284, 286; 713/182–185, 176; 726/28, 30, 33, 4; 714/22–30; 709/206
See application file for complete search history.

(56) References Cited

U.S. PATENT DOCUMENTS

| 5,226,079 | A | | 7/1993 | Holloway |
|---|---|---|---|---|
| 5,555,426 | A | | 9/1996 | Johnson et al. |
| 6,081,793 | A | * | 6/2000 | Challener et al. .............. 705/50 |
| 6,112,305 | A | | 8/2000 | Dancs et al. |
| 6,314,521 | B1 | | 11/2001 | Debry |

(Continued)

FOREIGN PATENT DOCUMENTS

JP 11-195004 A 7/1999

OTHER PUBLICATIONS

Raymond, "Improving Confidence in Cross Border Electronic Commerce: Communication, Signature, and Authentication Devices", Jan. 2011, Journal of Internet Law, p. 25-34.*

(Continued)

*Primary Examiner* — Kenneth Chang
*Assistant Examiner* — Gregory Lane
(74) *Attorney, Agent, or Firm* — Stephen J. Walder, Jr.; William Stock

(57) ABSTRACT

Methods, systems, and products are disclosed in which generating evidence of web services transactions are provided generally by receiving in an ultimate recipient web service from an initial sender a request, the request containing a proof of message origin ('PMO'). The PMO contains an element addressed to the ultimate recipient web service and the element bears a first signature, the first signature having a value. Embodiments also include authenticating the identity of the initial sender; creating a proof of message receipt ('PMR') including signing the value of the first signature; sending the PMR to the initial sender, receiving, by the initial sender, the PMR; and saving, by the initial sender, the PMR.

16 Claims, 8 Drawing Sheets

(56) References Cited

U.S. PATENT DOCUMENTS

| | | |
|---|---|---|
| 6,360,221 B1 | 3/2002 | Gough et al. |
| 6,795,920 B1 | 9/2004 | Bacha et al. |
| 6,802,003 B1 | 10/2004 | Gross et al. |
| 6,836,765 B1 | 12/2004 | Sussman |
| 6,839,843 B1 | 1/2005 | Bacha et al. |
| 2004/0107170 A1* | 6/2004 | Labrou et al. ............. 705/64 |
| 2004/0186912 A1* | 9/2004 | Harlow et al. ............. 709/237 |
| 2005/0044412 A1* | 2/2005 | Bishop et al. ............. 713/201 |
| 2005/0177518 A1* | 8/2005 | Brown ............. 705/64 |
| 2005/0193075 A1* | 9/2005 | Haff et al. ............. 709/206 |
| 2005/0232421 A1* | 10/2005 | Simons et al. ............. 380/255 |
| 2007/0043948 A1* | 2/2007 | Bugbee ............. 713/176 |

OTHER PUBLICATIONS

Massarani, Leonardo C., "Method and Apparatus for Conducting Off-Line E-Commerce Transactions", filed Mar. 31, 1999, U.S. Appl. No. 09/282,768.

Oppliger, Rolf et al., "Certified Mail: The Next Challenge for Secure Messaging", Communications of the ACM, vol. 47, No. 8, Aug. 2004, pp. 75-79.

* cited by examiner

GENERATING EVIDENCE OF WEB SERVICES TRANSACTIONS

BACKGROUND OF THE INVENTION

1. Technical Field

The field of the invention is data processing, or, more specifically, methods, systems, and products for generating evidence of web services transactions.

2. Description of the Related Art

The term "web services" refers to a standardized way of integrating web-based applications. Web services typically provide business services upon request through data communications in standardized formats called bindings. A binding is a specification of a data encoding method and a data communications protocol. The most common binding in use for web services is data encoding in XML according to the SOAP protocol and data communications with HTTP. SOAP (Simple Object Access Protocol) is a request/response messaging protocol that supports passing structured and typed data using XML and extensions.

Unlike traditional client/server models, such as an HTTP server that provides HTML documents in response to requests from browser clients, web services are not concerned with display. Web services instead share business logic, data, and processes through a programmatic interface across a network. Web services applications interface with one another, not with users. Because all data communications among web services are carried out according to standardized bindings, Web services are not tied to any one operating system or programming language. A Java client running in a Windows™ platform can call web service operations written in Perl and running under Unix. A Windows application written in C++ can call operations in a web service implemented as a Java servlet.

As discussed above, web services typically provide business services upon request through data communications in standardized formats called bindings. Such business services are typically carried out through request/response protocols in which a client or intermediary requester transmits a request message to a web service requesting a particular service, and the web service provides a response in the form of a response message. Disputes may arise in such a business transaction carried out as a message exchange. A dispute may arise, for example, if a web service never receives a request or does not respond to a received request. In order to protect the interests of parties operating requestors and web services, it is desirable to generate and preserve some evidence of the requests and responses for dispute resolution. There is an ongoing need for generating evidence of web services transactions.

SUMMARY

Methods, systems, and products are disclosed in which generating evidence of web services transactions are provided generally by receiving in an ultimate recipient web service from an initial sender a request, the request containing a proof of message origin ('PMO'). The PMO contains an element addressed to the ultimate recipient web service and the element bears a first signature, the first signature having a value. Embodiments also include authenticating the identity of the initial sender; creating a proof of message receipt ('PMR') including signing the value of the first signature; sending the PMR to the initial sender, receiving, by the initial sender, the PMR; and saving, by the initial sender, the PMR.

Creating a PMR may be carried out by creating a receipt acknowledgement element, inserting the value of the first signature in the receipt acknowledgement element, and signing the value of the first signature may be carried out by signing the receipt acknowledgement element. Creating a PMR may further include associating the PMR with a PMO. Embodiments may also include saving the PMR for dispute resolution. Embodiments may also include determining that the PMR includes a signed value of the first signature and authenticating the identity of the web service.

The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

Figure 1:
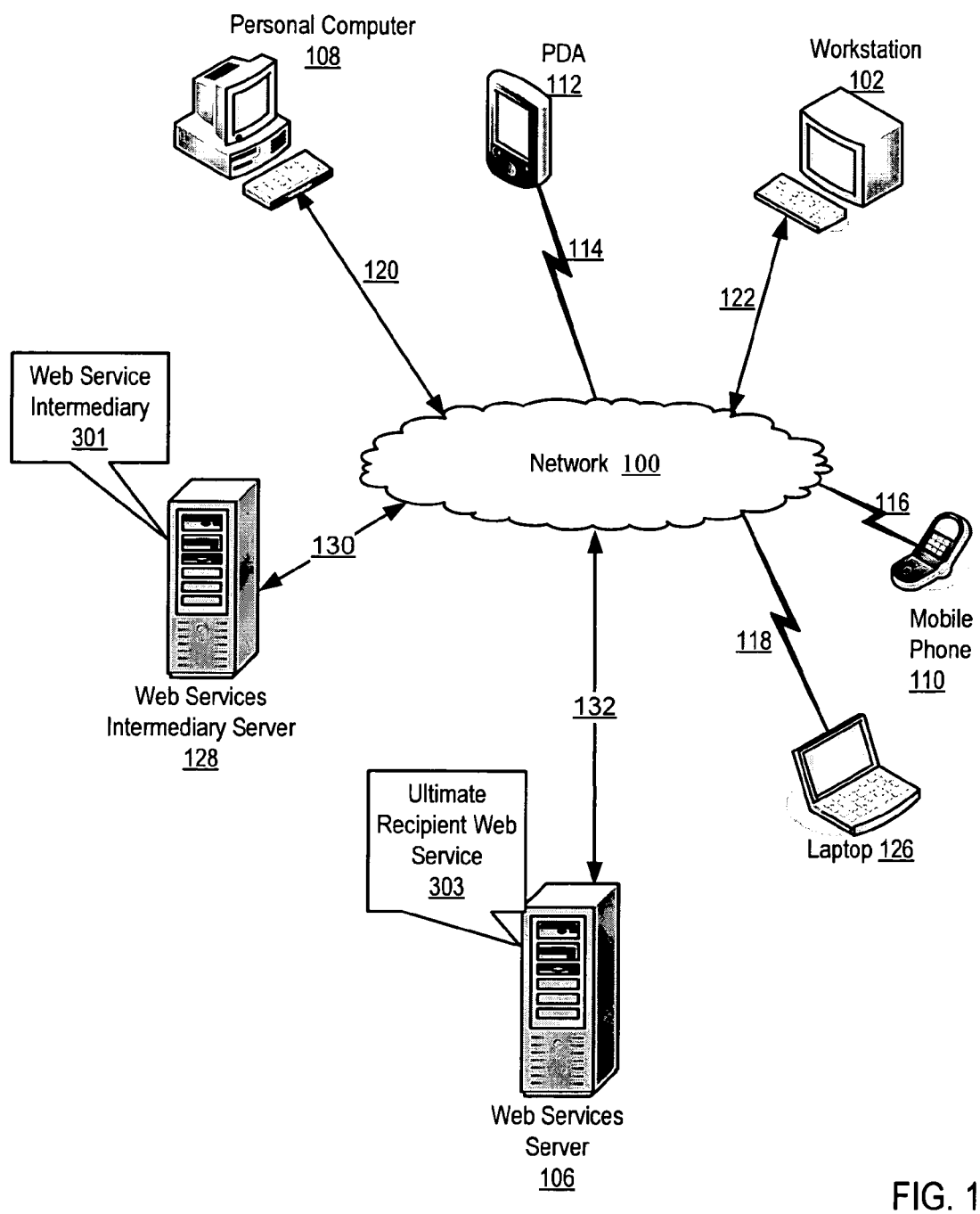
FIG. 1 sets forth a network diagram illustrating an exemplary system for generating evidence of web services transactions according to embodiments of the present invention.

Exemplary methods, systems and products for generating evidence of web services transactions according to embodiments of the present invention are described with reference to the accompanying drawings, beginning with FIG. 1. FIG. 1 sets forth a network diagram illustrating an exemplary system for generating evidence of web services transactions according to embodiments of the present invention. The term 'network' is used in this specification to mean any networked coupling for data communications among two or more computers. Network data communication typically is implemented with specialized computers called routers. Networks typically implement data communications by encapsulating computer data in messages that are then routed from one computer to another. A well known example of a network is an 'internet,' an interconnected system of computers that communicate with one another according to the 'Internet Protocol' as described in the IETF's RFC 791. Other examples of networks useful with various embodiments of the present invention include intranets, extranets, local area networks ('LANs'), wide area networks ("WANs"), and other network arrangements as will occur to those of skill in the art. The use of any networked coupling from a requester to a web server supporting a web service is well within the scope of the present invention.

The system of FIG. 1 includes a data communications network (100). Network (100) provides data communications between initial senders (108, 112, 102, 110, 126) of requests for web services and an ultimate recipient web service (303). Web services server (106) is a computer, coupled for data communications through wireline connection (132) to network (100), upon which an ultimate recipient web service (303) is installed and operative. Computer program instructions for carrying out the functions of the ultimate recipient web service (303) are stored in a computer memory in web services server (106).

Initial senders installed on devices (108, 112, 102, 110, 126) transmit to ultimate recipient web service installed on a web services server (106) requests for services. That is, a web services transaction occurs in the example of FIG. 1 between an initial sender and an ultimate recipient web service. The ultimate recipient web service (303) receives the requests over the network (100), processes the requests, and transmits responses over network (100). As discussed in more detail below, the request may be sent from the initial sender to the ultimate recipient web service through an intermediary (301) which may perform additional processing on the request.

The system of FIG. 1 includes several devices capable of supporting initial senders. Such initial senders are capable of transmitting a request for web services to the ultimate recipient web service (303) and receiving a response. Devices capable of supporting initial senders in the system of FIG. 1 include:

workstation (102), a computer coupled to network (100) through wireline connection (122);
  personal computer (108), coupled to network (100) through wireline connection (120);
  personal digital assistant (112), coupled to network (100) through wireless connection (114);
  laptop computer (126), coupled to network (100) through wireless connection (118); and
  mobile phone (110), coupled to network (100) through wireless connection (116).

As discussed above, the term 'initial sender' refers to any data communications client, that is, any software capable of carrying out a transaction with an ultimate recipient web service by coupling for data communications to a web service, transmitting a request to the web service, and receiving a response back from the ultimate recipient web service. Examples of devices capable of supporting initial senders are personal computers, internet-enabled special purpose devices, internet-capable personal data administrators, and others that will occur to those of skill in the art. Such devices are capable of wired and/or wireless couplings to servers supporting web services.

FIG. 1 also includes web services intermediary server (128), coupled to network (100) through wireline connection (130). Web services intermediary server (128) has installed and operative upon it a web service intermediary (301). A web services intermediary is a web services component, in this example, installed on a server, that lies between a web services requester and a web service. Intermediaries operate generally by receiving a request from an initial sender to an ultimate recipient web service, providing intermediary services, and then forwarding the request to the ultimate recipient web service. Similarly, responses from the ultimate recipient web service provider may be received by the intermediary, operated upon, and then returned to the initial sender.

Services provided by intermediaries include, for example, authentication of sources of requests for ultimate recipient services, message validation for content and form, and message logging for auditing purposes. Intermediaries may provide management reporting services, number of web service hits, quantity and timing of services used by individual initial senders, and so on. Intermediaries can be used as caches in support of improved performance by storing frequently changing but frequently requested data such as news stories, for example. Intermediaries can be used for performance improvement in the sense of load balancing, storing requests for services from several initial senders and forwarding them to an ultimate recipient service during off-peak service hours. Intermediaries may aggregate services, as, for example, an accounting intermediary that accepts requests for account postings that are then forwarded to separate ultimate recipient web services for accounts payable, accounts receivable, and general ledger services.

The system of FIG. 1 operates generally to generate evidence of web services transactions according to embodiments of the present invention by receiving in an ultimate recipient web service from an initial sender a request containing a proof of message origin ('PMO'). A PMO is a collection of one or more elements of a message that are signed by the initial sender and addressed to the ultimate recipient web service. A PMO is often designed to provide proof that a request originated with a particular initial sender and proof of the contents of the request. Such proof is useful for dispute resolution to determine that the designation of the particular initial sender as the originator of the request and the contents of the request targeted to the ultimate recipient were not altered by an intermediary.

As discussed above, the most common binding in use for web services is data encoding in XML according to the SOAP protocol and data communications with HTTP. SOAP (Simple Object Access Protocol) is a request/response messaging protocol that supports passing structured and typed data using XML and extensions. Generating evidence of web services transactions according to embodiments of the present invention is discussed in this specification primarily in the context of the SOAP protocol. This is for explanation and not for limitation. In fact, any binding in use for web services capable of supporting PMOs and PMRs according to embodiments of the present invention may be useful for generating evidence of web services transactions within the scope of the present invention.

In the system of FIG. 1, in response to receiving a request containing a PMO, the ultimate recipient web service also operates generally by authenticating the identity of the initial sender and creating a proof of message receipt ('PMR'). A PMR is a collection of one or more elements of a response to the received message sent by the ultimate recipient web service and addressed to the initial sender. A PMR is often designed to provide proof that a response was sent by the ultimate recipient to a particular initial sender and that the response was sent in response to the request from the particular initial sender. A PMR is also often designed to provide proof of the contents of the response. Such proof is useful for dispute resolution to determine that the ultimate recipient actually responded to a request from a particular initial sender and to determine that the response contained the proper contents.

Because PMOs and PMRs are useful for dispute resolutions, PMOs and PMRs for a web services transaction are saved by the initial sender and the ultimate recipient. Saving the PMOs and PMRs advantageously provides evidence of web services transactions for dispute resolution.

The arrangement of client devices, servers, networks, and other devices making up the exemplary system illustrated in FIG. 1 are for explanation, not for limitation. Data processing systems useful for generating evidence of web services transactions according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms and network configurations in addition to those illustrated in FIG. 1.

Figure 2:
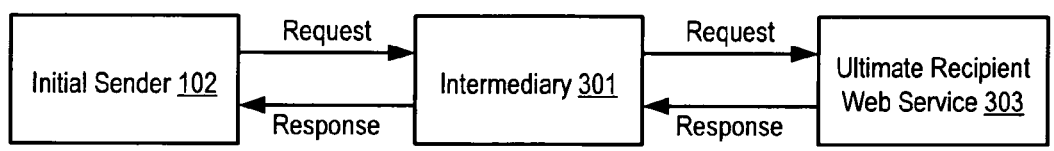
FIG. 2 sets forth line drawings of exemplary architectures for web services in which secure data communications may be implemented according to embodiments of the present invention.

For further explanation, FIG. 2 sets forth a line drawing of an exemplary computer architecture for web services in which generating evidence of web services transactions may be implemented according to embodiments of the present invention. In the architecture of FIG. 2, web service intermediary (301) is coupled for data communications through a data communications protocol to initial sender (102) and ultimate recipient web service (303). Web services transaction typically consist of a series of messages. The initial sender (102) in the example of FIG. 2 is the client that initiated the series of messages, sending the first message of the series. The ultimate recipient web service (303) is the target web service of the initial message, the web service from which the initial sender is seeking a response. Both web service intermediary (301) and ultimate recipient web service (303) in the example of FIG. 2 are installed upon servers supporting web services. As discussed above, PMOs are useful in the system of FIG. 2 to provide proof that a request originated with the initial sender (102) and proof of the contents of the request. PMRs are useful to provide proof that a response was sent by the ultimate recipient web service (303) to the particular initial sender (102) and that the response was sent in response to the request from the initial sender (102). A PMR is also useful to provide proof of the contents of the response. PMOs and PMRs advantageously provide proof that pertinent portions of a request or response were not altered by the intermediary (301).

Generating evidence of web services transactions in accordance with the present invention is generally implemented with computers, that is, with automated computing machinery. In the system of FIG. 1, for example, all the nodes, servers, and communications devices are implemented to some extent at least as computers. For further explanation, therefore, FIG. 3 sets forth a block diagram of automated computing machinery comprising an exemplary web services server (106) useful in generating evidence of web services transactions according to embodiments of the present invention. The web services server (106) of FIG. 3 includes at least one computer processor (156) or 'CPU' as well as random access memory (168) ('RAM') which is connected through a system bus (160) to processor (156) and to other components of the web services server.

Stored in RAM (168) is an ultimate recipient web service (303), a set of computer program instructions improved for generating evidence of web services transactions according to embodiments of the present invention. Also stored in a RAM (168) is a SOAP request (304) for a service. Also stored in a RAM (168) is a SOAP response (360) to the SOAP request. The computer program instructions of the ultimate recipient web service (303) include instructions for receiving in an ultimate recipient web service (303) from an initial sender a SOAP request containing a PMO. The ultimate recipient web service (303) also includes computer program instructions for authenticating the identity of the initial sender and creating a PMR.

Also stored in RAM (168) is an operating system (154). Operating systems useful in web services servers according to embodiments of the present invention include UNIX™, Linux™, Microsoft NT™, AIX™, IBM's i5/OS™, and others as will occur to those of skill in the art. Operating system (154), ultimate recipient web service (303), SOAP request (304), and SOAP response (360) in the example of FIG. 3 are shown in RAM (168), but many components of such software typically are stored in non-volatile memory (166) also.

Figure 3:
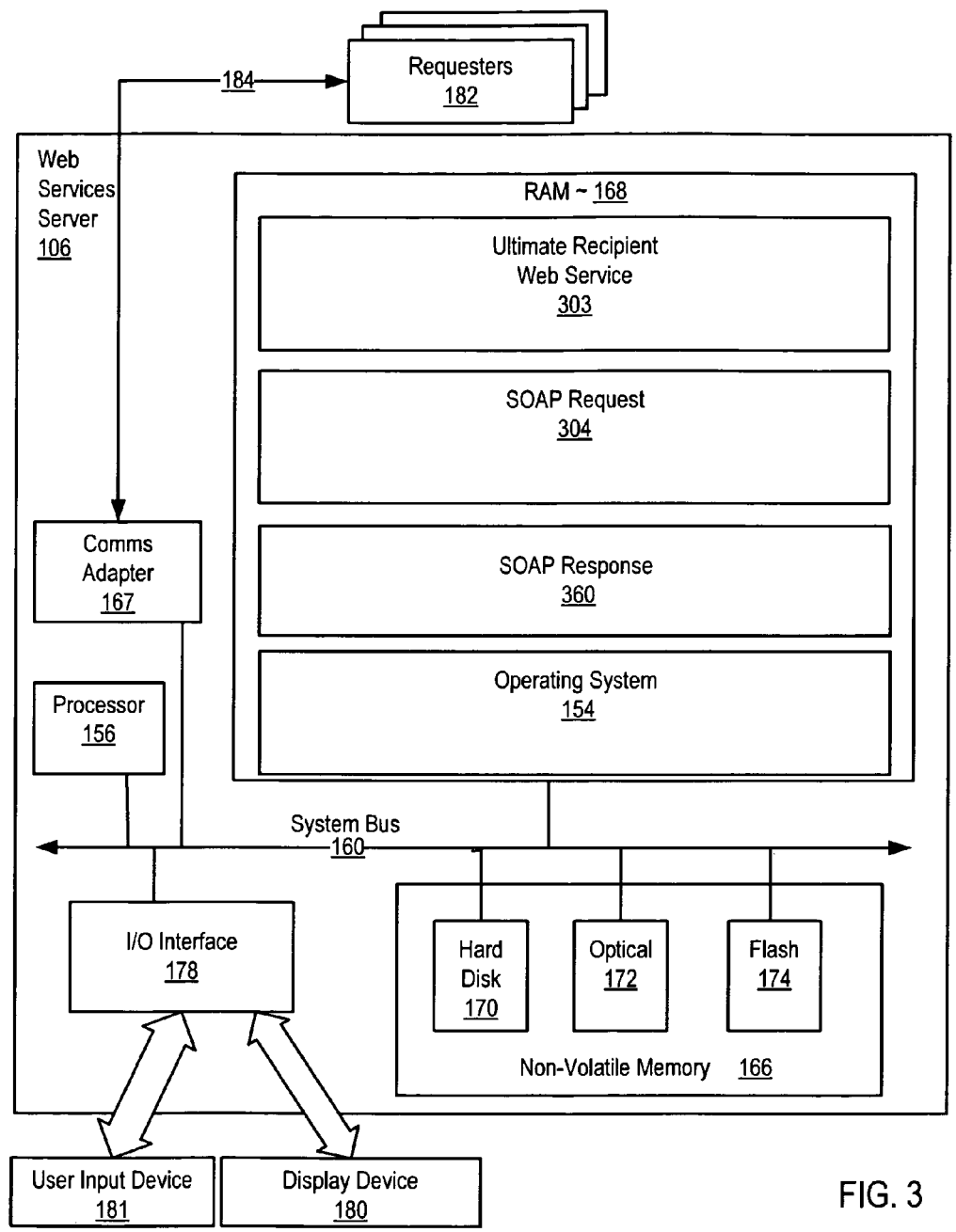
FIG. 3 sets forth a block diagram of automated computing machinery comprising an exemplary computer useful in generating evidence of web services transactions according to embodiments of the present invention.

Web services server (106) of FIG. 3 includes non-volatile computer memory (166) coupled through a system bus (160) to processor (156) and to other components of the web services server (106). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example web services server of FIG. 3 includes one or more input/output interface adapters (178). Input/output interface adapters in web services servers implement user-oriented input/output through, for example, software drivers and computer hardware for controlling output to display devices (180) such as computer display screens, as well as user input from user input devices (181) such as keyboards and mice.

The exemplary web services server (106) of FIG. 3 includes a communications adapter (167) for implementing data communications connections (184) with initial senders, other requesters (182), web service intermediaries, other web services, and other computers. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (EEE 802.3) adapters for wired network communications, and 802.11b adapters for wireless network communications.

Figure 4:
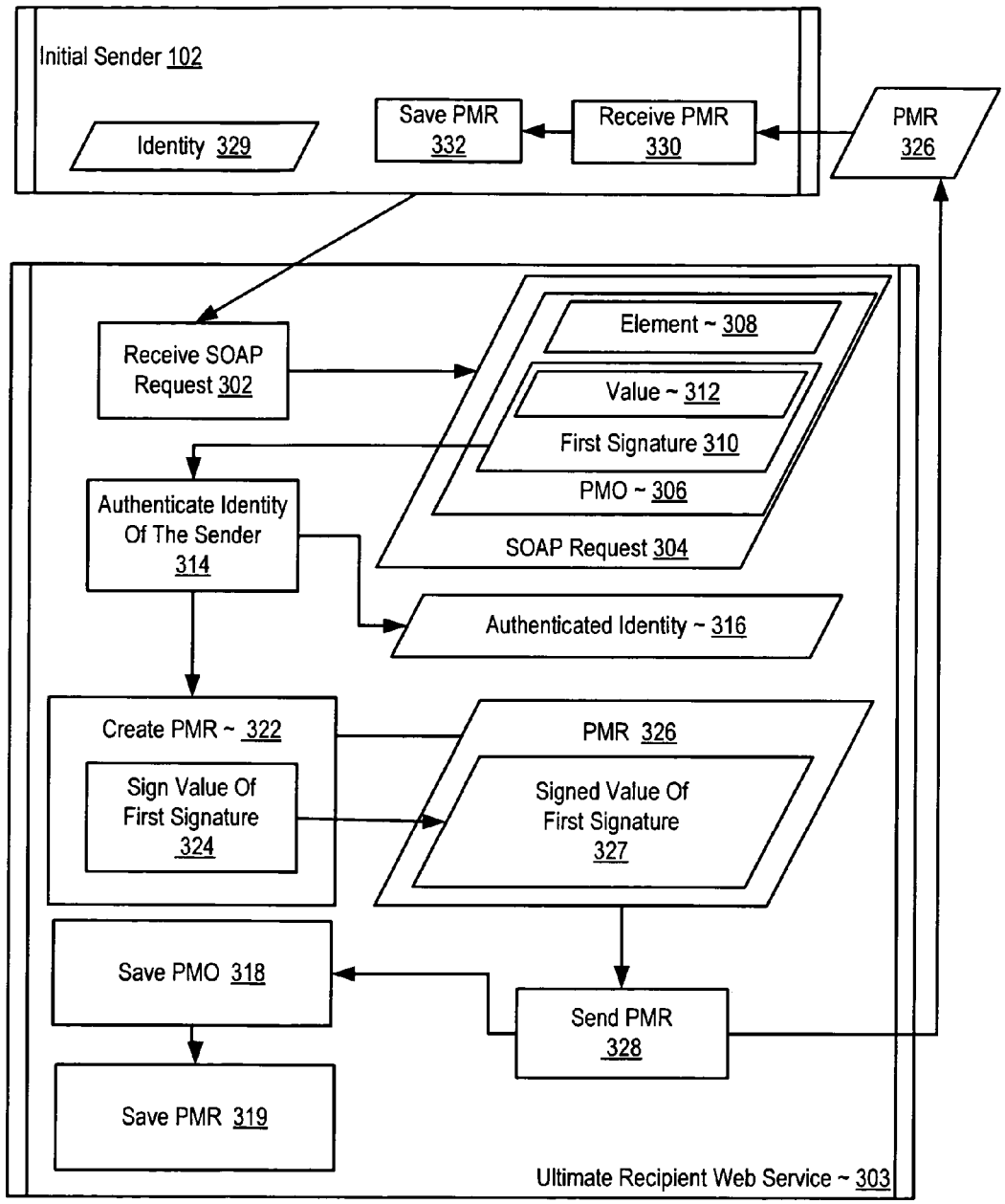
FIG. 4 sets forth a flow chart illustrating an exemplary method for generating evidence of web services transactions according to embodiments of the present invention.

For further explanation, FIG. 4 sets forth a flow chart illustrating an exemplary method for generating evidence of web services transactions according to embodiments of the present invention that includes receiving (302) in an ultimate recipient web service (303) from an initial sender (102) a SOAP request (304). The SOAP request (304) of FIG. 4 is implemented as a SOAP message from an initial sender to an ultimate recipient web service. SOAP (Simple Object Access Protocol) is a request/response messaging protocol that supports passing structured and typed data using XML and extensions. SOAP messages may be transmitted from initial senders to ultimate receivers according to a number of protocols, including SMTP, MIME, HTTP, and so on. SOAP messages may also be sent and received by other means that will occur to those of skill in the art, and all such means are well within the scope of the present invention.

In the example of FIG. 4, the SOAP request (304) contains a proof of message origin ('PMO') (306). As discussed above, a PMO is a collection of one or more elements of a SOAP message that are signed by the initial sender and addressed to the ultimate recipient web service. A PMO is often designed to provide proof that a request originated with a particular initial sender and proof of the contents of the request. Such proof is useful for dispute resolution to determine that the designation of the particular initial sender as the originator of the request and the contents of the request targeted to the ultimate recipient were not altered by an intermediary.

The PMO (306) of FIG. 4 contains an element (308) addressed to the ultimate recipient web service bearing a first signature (310), and the first signature (310) has a value (312). SOAP messages are expressed in XML and therefore, element (308) may be implemented as an XML element, that is, message structure implemented with XML tags.

The element (308) of FIG. 4 is addressed to the ultimate recipient web service (303). The element (308) of the SOAP message of FIG. 4 may be addressed to the ultimate recipient web service (303) in two different ways. The element is given the default address of the message or may be individually addressed. The address of a SOAP message, and therefore the default address of the element (308) if no other addressing is assigned to the element, is the address specified in the <to> element of the SOAP message in the message header. The <to> header element identifies the intended ultimate recipient of the message. The value of the <to> element may be a reference, such as for example a universal resource locator ('URL') or universal resource identifier ('URI'), to an entity, processor, or resource where the message is targeted.

The element (308) of FIG. 4 may alternatively be addressed individually to the ultimate recipient web service (303). In such cases, the element (308) may be addressed individually by specifying a functional role as an attribute of the element (308). The attribute of the element is then associated with the ultimate recipient web service to address the element individually to the ultimate recipient web service.

The element (308) of FIG. 4 addressed to the ultimate recipient web service bears a first signature (310) having a value (312). The first signature (310) may be created by creating a digital signature of the element (308), for example, by hashing element (308) and encrypting the hash with the initial sender's private key in a public key/private key infrastructure. The value (312) of the first signature (310) in the example of FIG. 4 is the encrypted hash.

The method of FIG. 4 also includes authenticating (314) the identity (329) of the initial sender (102). Authenticating (314) the identity (329) of the initial sender (102) may be carried out by, for example, by decrypting the first signature, yielding a purported hash of element (308). The purported hash so produced may be compared with a hash of the element (308). The identity (329) of the initial sender (102) is authenticated (314) if the two hashes are equal. Decrypting the first signature (310) with the initial sender's public key authenticates the identity of the initial sender because the element (308) can only have been encrypted by the initial sender (102) using the initial sender's private key. The authentication process also provides assurance of the integrity of element (308), that is, that element (308) has been received without alteration. Had the contents of element (308) been altered in transmission, the hash of the received element (308) would not equal the hash of the sent element (308) performed by the initial sender (102) in producing first signature (310).

The method of FIG. 4 also includes creating (322) a proof of message receipt ('PMR') (326). As discussed above, a PMR is a collection of one or more elements of a response to the received SOAP message sent by the ultimate recipient web service and addressed to the initial sender. A PMR is often designed to provide proof that a response was sent by the ultimate recipient to a particular initial sender and that the response was sent in response to the request from the particular initial sender. A PMR is also often designed to provide proof of the contents of the response. Such proof is useful for dispute resolution to determine that the ultimate recipient actually responded to a request from a particular initial sender and to determine that the response contained the proper contents. In the method of FIG. 4, creating (322) a proof of message receipt ('PMR') (326) includes signing (324) the value of the first signature. Signing (324) the value of the first signature may be carried out by hashing the value of the first signature and encrypting the hash with the ultimate recipient web service's private key in a public key/private key infrastructure, thereby producing a second signature, which is the signed value of the first signature (327). This signed value of the first signature (327) provides proof that the ultimate recipient web service (303) received the SOAP request (304). Such proof is revealed by decrypting the signed value of the first signature (327), yielding a purported hash of the value of the first signature. The purported hash so produced may be compared with a hash of the value of the first signature. The ultimate recipient web service (303) received the SOAP request (304) if the two hashes are equal. Signing (324) the value of the first signature also advantageously provides proof that the ultimate recipient web service (303) received the PMO (306) because the first signature was included in the PMO and therefore must have been received.

The method of FIG. 4 also includes sending (328) the PMR (326) to the initial sender (102). SOAP messages may be transmitted from ultimate recipient web services to initial senders according to a number of protocols, including SMTP, MIME, HTTP, and so on. SOAP messages may also be sent and received by other means that will occur to those of skill in the art, and all such means are well within the scope of the present invention.

The method of FIG. 4 also includes saving (318) the PMO (306). Saving the PMO (306) may be carried out by writing the PMO to memory, or by writing it to a removable storage medium, or by other means that will occur to those of skill in the art, and all such means are well within the scope of the present invention. Saving the PMO advantageously provides evidence of the transactions between the initial sender and the ultimate recipient web service for dispute resolution.

The method of FIG. 4 also includes saving (319) the PMR (328). Saving the PMR may be carried out by writing the PMR to memory, by writing it to a removable storage medium, or by other means that will occur to those of skill in the art, and all such means are well within the scope of the present invention. Saving the PMR advantageously provides evidence of the transactions between the initial sender and the ultimate recipient web service for dispute resolution.

The method of FIG. 4 also includes receiving (330), by the initial sender (102), the PMR (326) and saving (332), by the initial sender (102), the PMR (326). Saving the PMR (326) may be carried out by writing the PMR to memory, or by writing it to a removable storage medium, or by printing it out, or by other means that will occur to those of skill in the art, and all such means are well within the scope of the present invention. Saving the PMR advantageously provides evidence of the transactions between the initial sender and the ultimate recipient web service for dispute resolution.

The illustration in FIG. 4 of a PMO containing a single element and a single signature is for explanation and not for limitation. In fact, a single signature may be used to sign many elements of a PMO or multiple signatures may be used to sign multiple elements. All such ways of signing elements are within the scope of the present invention.

Figure 5:
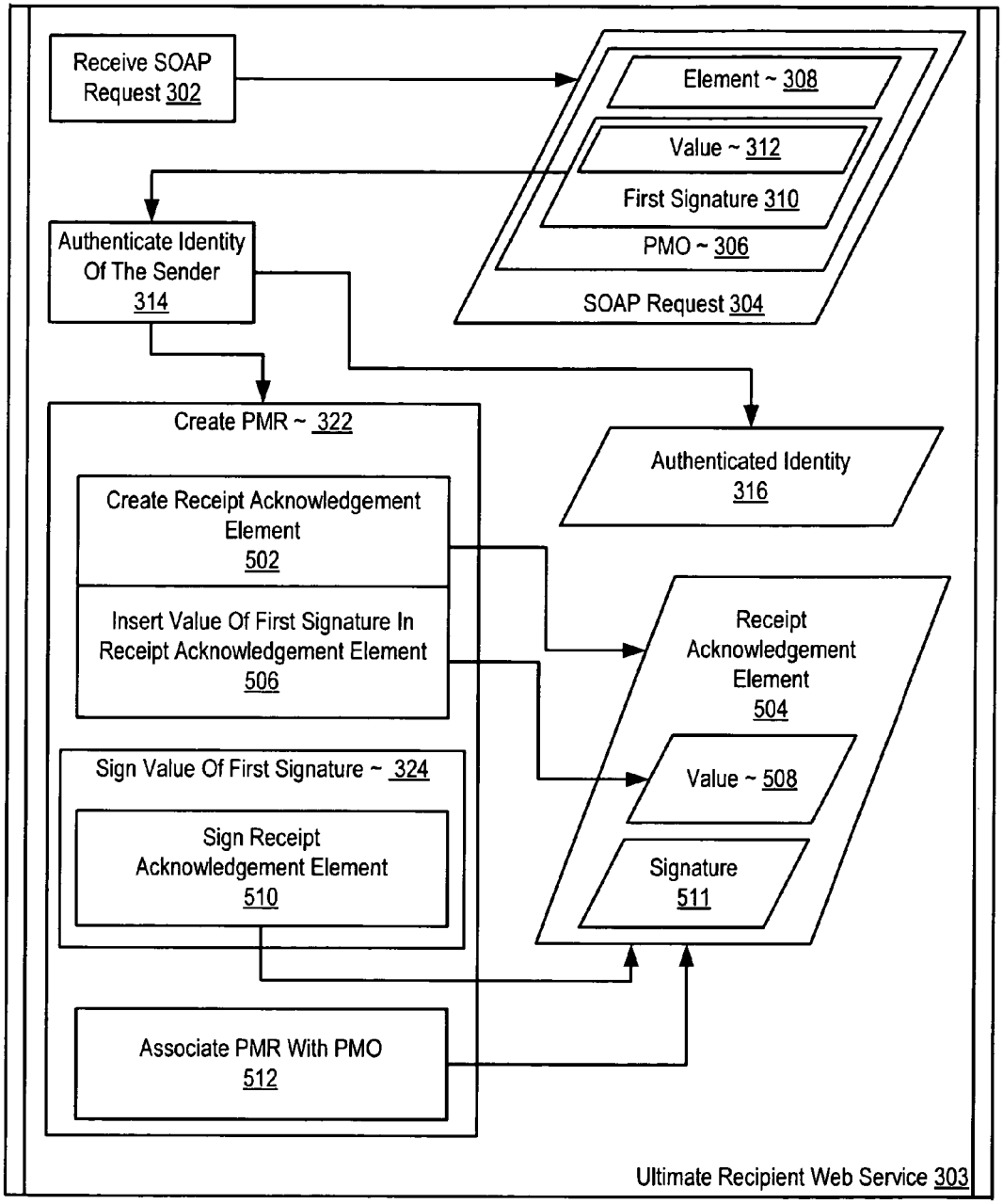
FIG. 5 sets forth a flow chart illustrating a further exemplary method for generating evidence of web services transactions according to embodiments of the present invention.

For further explanation, FIG. 5 sets forth a flow chart illustrating a further exemplary method for generating evidence of web services transactions according to embodiments of the present invention. The exemplary method of FIG. 5 is similar to the method of FIG. 4. That is, the method of FIG. 5 includes receiving (302) in an ultimate recipient web service (303) from an initial sender (102) a SOAP request (304). The SOAP request contains a PMO (306), which contains an element (308) addressed to the ultimate recipient web service. The element (308) bears a first signature (310) having a value (312). The method of FIG. 5 also includes authenticating (314) the identity (329) of the initial sender (102) and creating (322) a PMR (326) by signing (324) the value of the first signature.

In the method of FIG. 5, however, creating (322) a PMR (326) further includes creating (502) a receipt acknowledgement element (504) and inserting (506) the value (312) of the first signature (310) in the receipt acknowledgement element (504). A receipt acknowledgement element may be implemented as an XML element having a field containing the value of the first signature.

In the method of FIG. 5, signing (324) the value of the first signature further includes signing (510) the receipt acknowledgement element (504). Signing (510) receipt acknowledgement (504) element may be carried out by hashing the receipt acknowledgement (504) element and encrypting the hash with a private key from a public key/private key infrastructure.

In the method of FIG. 5, creating a PMR (322) further includes associating (512) the PMR with the PMO (306). Associating (512) the PMR with the PMO (306) may be carried out by including signed contents from the PMO in the PMR, thereby providing proof of the contents of SOAP request which was received. The PMR may include none, one, or more than one of the signed contents of the PMO addressed to the ultimate recipient web service (303). For example, a PMR may include the value of the first signature contained in the PMO.

Figure 6:
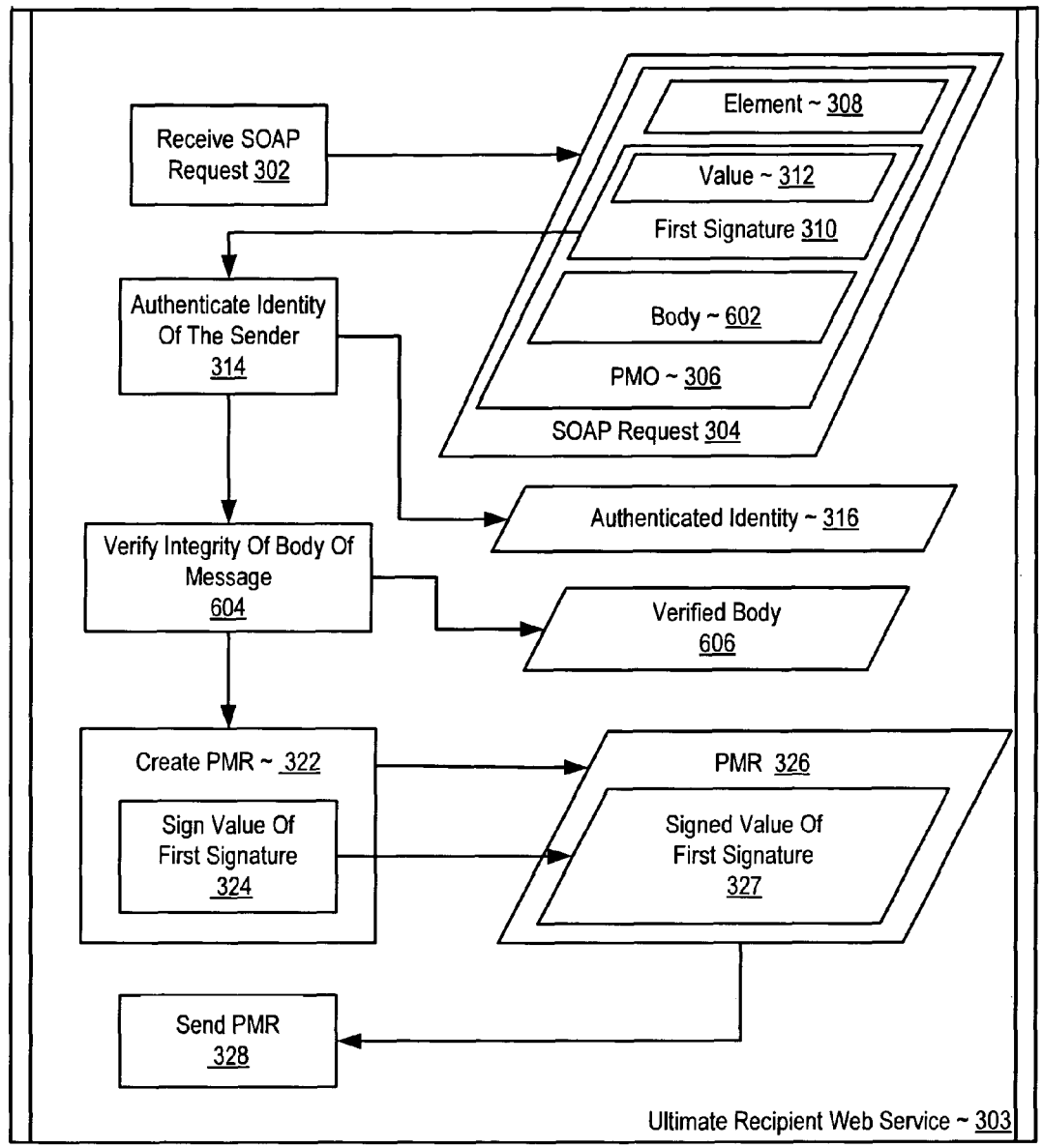
FIG. 6 sets forth a flow chart illustrating a further exemplary method for generating evidence of web services transactions according to embodiments of the present invention.

For further explanation, FIG. 6 sets forth a flow chart illustrating a further exemplary method for generating evidence of web services transactions according to embodiments of the present invention. That is, the method of FIG. 6 includes receiving (302) in an ultimate recipient web service (303) from an initial sender a SOAP request (304). The SOAP request contains a PMO (306), which contains an element (308) addressed to the ultimate recipient web service. The element (308) bears a first signature (310) having a value (312). The method of FIG. 6 also includes authenticating (314) the identity of the initial sender and creating (322) a PMR (326). Creating (322) the PMR (326) includes signing (324) the value of the first signature.

The method of FIG. 6, however, also includes verifying (604) the integrity of body (602) of the SOAP request (304). The PMO may contain a body of the SOAP request (304) signed by hashing body (602) and encrypting the hash with the initial sender's private key from a public key/private key infrastructure, thereby producing a signature. Verifying (604) the integrity of body (602) of the SOAP request (304) may be carried out by, for example, decrypting the first signature with the initial sender's public key, yielding a purported hash of body (602). The purported hash so produced may be compared with a hash of body (602). The integrity of body (602) of SOAP request (304) is verified if the two hashes are equal. Had the contents of body (602) of SOAP request (304) been altered in transmission, the hash of the received element body (602) of SOAP request (304) would not equal the hash of the sent body element (602) of SOAP request (304) performed by the initial sender (102) in producing the signature.

Figure 7:
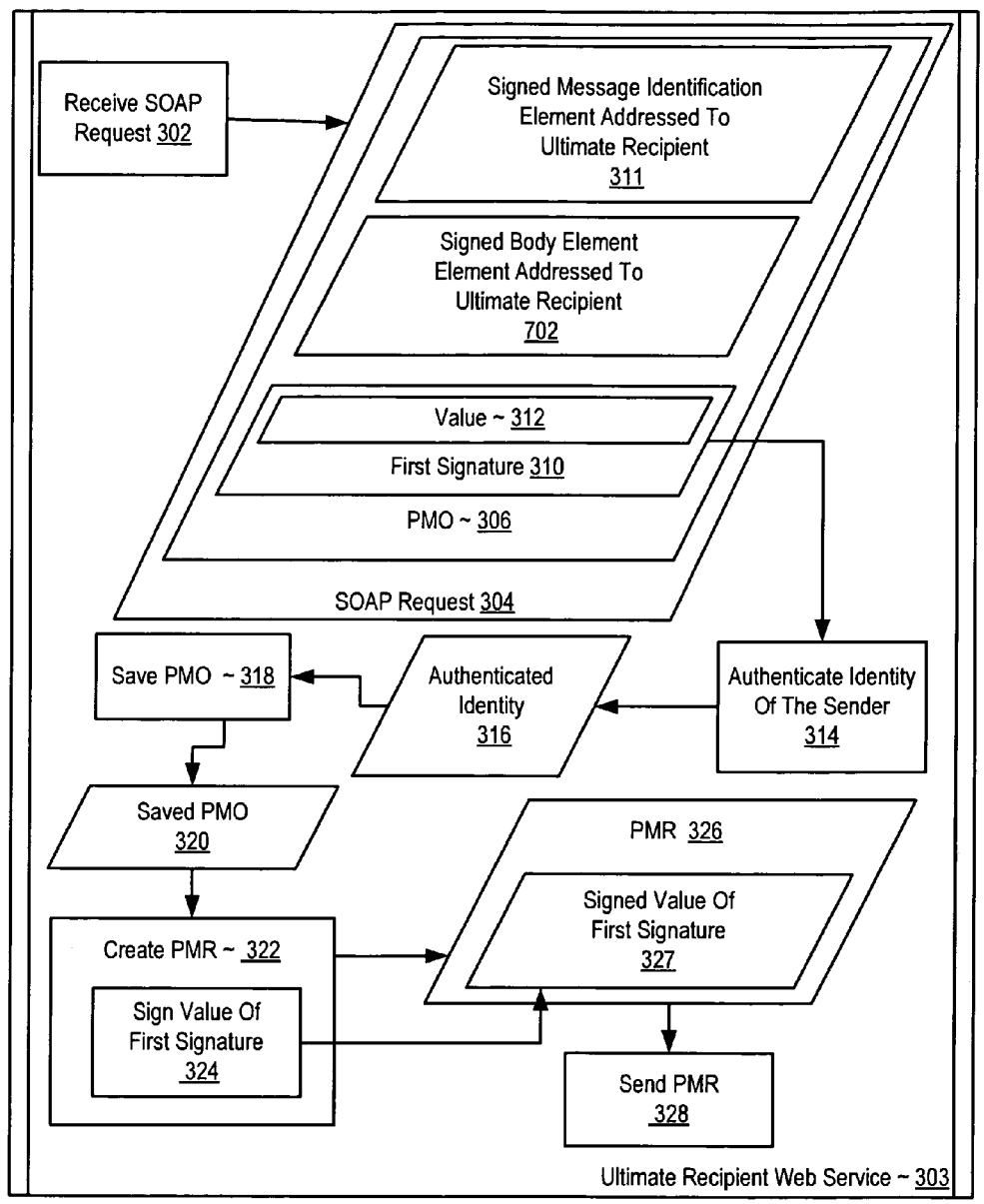
FIG. 7 sets forth a flow chart illustrating a further exemplary method for generating evidence of web services transactions according to embodiments of the present invention.

For further explanation, FIG. 7 sets forth a flow chart illustrating a further exemplary method for generating evidence of web services transactions according to embodiments of the present invention. The exemplary method of FIG. 7 is similar to the method of FIG. 4. That is, the method of FIG. 7 includes receiving (302) in an ultimate recipient web service (303) from an initial sender (102) a SOAP request (304). The SOAP request contains a PMO (306) containing an element (308) addressed to the ultimate recipient web service. The element (308) bears a first signature (310) having a value (312). The method of FIG. 7 also includes authenticating (314) the identity (316) of the initial sender (102) and creating (322) a PMR (326). Creating the PMR includes signing (324) the value of the first signature.

In the method of FIG. 7, however, the PMO (306) contains a signed message identification element (311) addressed to the ultimate recipient. A message identification element (311) is an element which contains a unique identifier for the message. The sender of the message may generate a different identifier for each message, except possibly for retransmissions of a message, thereby assuring that each message identifier uniquely identifies a message. Message identification element (311) may be signed by hashing message identification element (311) and encrypting the hash with the initial sender's private key from a public key/private key infrastructure. The message identification element (311) may be addressed to the ultimate recipient by inserting message identification element (311) in the header of the SOAP request (304) and not specifying an address for the message identification element (311) thereby addressing by default the message identification element as the address of the message.

In the method of FIG. 7, the PMO (306) also contains a signed body element (702) addressed to the ultimate recipient. Body element (702) may be signed by hashing body element (702) and encrypting the hash with the initial sender's private key from a public key/private key infrastructure. In the SOAP protocol, a body element is automatically addressed to the ultimate recipient.

Figure 8:
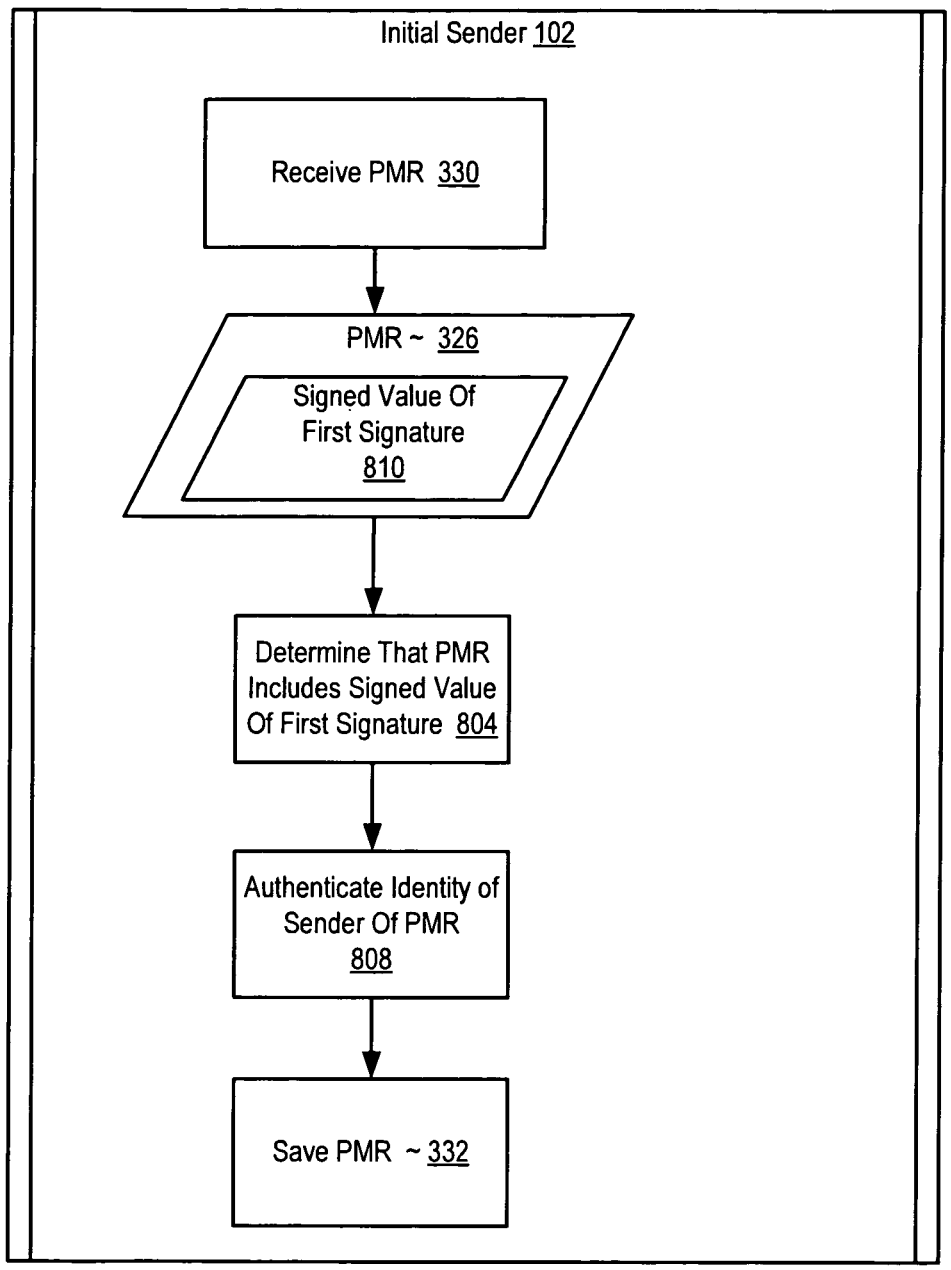
FIG. 8 sets forth a flow chart illustrating a further exemplary method for generating evidence of web services transactions according to embodiments of the present invention.

For further explanation, FIG. 8 sets forth a flow chart illustrating a further exemplary method for generating evidence of web services transactions according to embodiments of the present invention. The method of FIG. 8 includes receiving (330) in the initial sender (102) a PMR. PMRs in SOAP messages may be transmitted from ultimate recipient web services to initial senders according to a number of protocols, including SMTP, MIME, HTTP, and so on. SOAP messages may also be sent and received by other means that will occur to those of skill in the art, and all such means are well within the scope of the present invention.

The method of FIG. 8 further includes determining (804) that the PMR (326) includes a signed value of the first signature (810). Determining (804) that the PMR (326) includes a signed value of the first signature (810) may be carried out by examining the SOAP message for a signature tag and verifying that the signature element has within it a signature.

The method of FIG. 8 further includes authenticating (808) the identity of the sender of the PMR. Authenticating (808) the identity of the sender of the PMR may be carried out by, for example, by decrypting the signed value of the first signature (810) produced by signing the value of the first signature, yielding a purported hash of the value of the first signature. The purported hash so produced may be compared with a hash of the value of the first signature. The identity (329) of the sender of the PMR is authenticated (314) if the two hashes are equal. Decrypting the signed value of the first signature (810) with the PMR sender's public key authenticates the identity of the PMR sender because the value of the first signature can only have been encrypted by the ultimate recipient web service using the ultimate recipient web service web service's private key.

The method of FIG. 8 further includes saving the PMR (332). Saving the PMR may be carried out by writing the PMR to memory, by writing it to a removable storage medium, or by other means that will occur to those of skill in the art, and all such means are well within the scope of the present invention. Saving the PMR advantageously provides evidence of the transactions between the initial sender and the ultimate recipient web service for dispute resolution.

For further explanation, the following pseudocode provides an example of a SOAP request containing a PMO:

```
<soap:Envelope ...>
  <soap:Header>
    <wsa:MessageID wsu:Id="MessageID-01">http://xyz.com/Message-
01</wsa:MessageID>
    <wsa:From wsu:Id="From-01">http://xyz.com/Requestor-01</
wsa:From>
    <wsa:To wsu:Id="To-01">http://xyz.com/Responder-01</wsa:To>
    <wsa:Action wsu:Id="Action-01">xyz:Request</wsa:Action>
    <wsse:Security>
      ...
      <ds:Signature>
        <ds:SignedInfo>
          <ds:Reference URI="#From-01">
            <ds:DigestMethod
            Algorithm="http://www.w3.org/2000/09/xmldsig#sha1"/>
            <ds:DigestValue>EULddytSo1...</ds:DigestValue>
          </ds:Reference>
          <ds:Reference URI="#To-01">
            <ds:DigestMethod
            Algorithm="http://www.w3.org/2000/09/xmldsig#sha1"/>
            <ds:DigestValue>EULddytSo1...</ds:DigestValue>
          </ds:Reference>
          <ds:Reference URI="#MessageID-01">
            <ds:DigestMethod
            Algorithm="http://www.w3.org/2000/09/xmldsig#sha1"/>
            <ds:DigestValue>EULddytSo1...</ds:DigestValue>
          </ds:Reference>
          <ds:Reference URI="#Action-01">
            <ds:DigestMethod
            Algorithm="http://www.w3.org/2000/09/xmldsig#sha1"/>
            <ds:DigestValue>EULddytSo1...</ds:DigestValue>
          </ds:Reference>
          <ds:Reference URI="#Body-01">
            <ds:DigestMethod
            Algorithm="http://www.w3.org/2000/09/xmldsig#sha1"/>
            <ds:DigestValue>EULddytSo1...</ds:DigestValue>
          </ds:Reference>
        </ds:SignedInfo>
        <ds:SignatureValue>BL8jdfToEb1l/vXcMZNNjPOV </
ds:SignatureValue>
        <ds:KeyInfo>
          ...
        </ds:KeyInfo>
      </ds:Signature>
    </wsse:Security>
  </soap:Header>
  <soap:Body wsu:Id="Body-01">
    <RequestBody>
      ...
    </RequestBody>
  </soap:Body>
</soap:Envelope>
```

This example is described as 'pseudocode' because it is an explanation presented in the general form of XML code rather than an actual working model of a request. This example encapsulates a SOAP <header> element and a SOAP <body> element in a SOAP <envelope>.

The exemplary SOAP request includes <wsa:MessageID> header element which uniquely identifies the message. The wsu:Id attribute of the <messageID> element is MessageID-01, indicating that the <messageID> element may be referenced by the name "MessageID-01." The <messageID> element is addressed to the ultimate recipient.

The <wsa:From> header block element in the exemplary SOAP request identifies the initial sender. The wsu:Id attribute of <from> element is From-01 and therefore may be referenced by the name "From-01." The <from> element is addressed to the ultimate recipient.

The <wsa:To> header element in the exemplary SOAP request identifies the intended ultimate recipient. The wsu:Id attribute of <to> element is To-01 and therefore the element may be referenced by the name "To-01." The <to> element is addressed to the ultimate recipient.

The <wsa:Action> header element in the exemplary SOAP request identifies the intended message semantics. The wsu:Id attribute of <Action> element is Action-01 and therefore the element may be referenced by the name "Action-01." The value of the <wsa:Action> element describes the type of action performed by the SOAP message. Here, xyz:Request indicates that the action carried out by the SOAP request is a form of a request by the xyz domain. The <action> element is addressed to the ultimate recipient.

The <soap:Body> element of the SOAP request contains the body of the SOAP request. The body of a SOAP request contains the substance of the request, a specification of the action requested of the recipient web service. The wsu:Id attribute of the <body> element is Body-01, indicating that the <body> element may be referenced by the name "Body-01." The <body> element is addressed to the ultimate recipient. Within the <body> element is the actual substance of the request, contained in the element named <RequestBody>.

The <header> element of the exemplary SOAP request contains a <wsse: Security> element which contains security information. The only element shown within the <security> element is <ds:Signature>, a SOAP implementation of a digital signature used to sign elements of the PMO. One sub-element of the <signedInfo> element is the <ds:Reference> element. The URI attribute of the <reference> element specifies the name of an element referenced by the signature and therefore under the signature. The first <reference> element specifies an element named "From-01," the <from> element in this SOAP message. The second <reference> element of the <signedInfo> element of the <signature> element refers to the element with the name "To-01," the <to> element of the SOAP message. The third <reference> element refers to the element with the name "MessageID-01," the <messageID> element of the SOAP message. The fourth <reference> element refers to the element with the name "Action-01," the <action> element of the SOAP message. The fifth <reference> element refers to the element with the name "Body-01," the <body> element of the SOAP message.

The <ds:SignatureValue> indicates the value of the signature. The value is obtained by digesting or hashing and then encrypting the elements that were signed, the elements referred to with the <reference> elements. In this case, the value of the digest or hash is obtained by combining and digesting the <messageID>, <from>, <to>, <action>, and <body> elements of the SOAP request, producing the value EULddytSo1 . . . That value is then encrypted to produce the value of the signature, "BL8jdfToEb1l/vXcMZNNjPOV."

The SOAP request illustrated in this example includes a PMO implemented as a collection of elements signed by the initial sender and addressed to the ultimate recipient web service. This exemplary PMO contains the <messageID>, <from>, <to>, <action>, and <body> elements each signed by the initial sender and addressed to the ultimate recipient web service.

The exemplary SOAP request is for explanation and not for limitation. In fact, SOAP request containing PMOs of the present invention may be implemented in many ways and all such ways are well within the scope of the present invention.

The following is pseudocode example of a SOAP response message that contains a PMR:

```
<soap:Envelope ...>
  <soap:Header>
    <wsa:From wsu:Id="From-02">http://xyz.com/Responder-01</wsa:From>
    <wsa:To wsu:Id="To-02">http://xyz.com/Requestor-01</wsa:To>
    <wsa:MessageID wsu:Id="MessageID-02">http://xyz.com/Message-02</wsa:MessageID>
    <wsa:RelatesTo
    RelationshipType="xyz:AcknowledgementMessage">http://xyz.com/Message-
        01</wsa:RelatesTo>
    <xyz:ReceiptAcknowledgement wsu:Id="ReceiptAcknowledgement-01">
      <wsa:RelatesTo
      RelationshipType="xyz:ReceiptAcknowledgement">http://xyz.com/Message-
        01</wsa:RelatesTo>
    ... <ds:SignatureValue>BL8jdfToEb1l/vXcMZNNjPOV</ds:SignatureValue>
    </xyz:ReceiptAcknowledgement>
    <wsse:Security>
      <ds:Signature>
        <ds:SignedInfo>
          <ds:Reference URI="#From-02">
            <ds:DigestMethod
            Algorithm="http://www.w3.org/2000/09/xmldsig#sha1"/>
            <ds:DigestValue>KpRyejY4uxwT9I74FYv8nQ</ds:DigestValue>
          </ds:Reference>
          <ds:Reference URI="#To-02">
            <ds:DigestMethod
            Algorithm="http://www.w3.org/2000/09/xmldsig#sha1"/>
            <ds:DigestValue>KpRyejY4uxwT9I74FYv8nQ</ds:DigestValue>
          </ds:Reference>
          <ds:Reference URI="#MessageID-02">
            <ds:DigestMethod
            Algorithm="http://www.w3.org/2000/09/xmldsig#sha1"/>
            <ds:DigestValue>KpRyejY4uxwT9I74FYv8nQ</ds:DigestValue>
          </ds:Reference>
          <ds:Reference URI="#ReceiptAcknowledgement-01">
            <ds:DigestMethod
            Algorithm="http://www.w3.org/2000/09/xmldsig#sha1"/>
            <ds:DigestValue>KpRyejY4uxwT9I74FYv8nQ</ds:DigestValue>
          </ds:Reference>
          <ds:Reference URI="#Body-02">
            <ds:DigestMethod
            Algorithm="http://www.w3.org/2000/09/xmldsig#sha1"/>
            <ds:DigestValue>KpRyejY4uxwT9I74FYv8nQ</ds:DigestValue>
          </ds:Reference>
        </ds:SignedInfo>
        <ds:SignatureValue> LyLsF0Pi4wPU</ds:SignatureValue>
      </ds:Signature>
    </wsse:Security>
  </soap:Header>
  <soap:Body wsu:Id="Body-02">
    <ResponseBody>
    ...
    </ResponseBody>
  </soap:Body>
</soap:Envelope>
```

The exemplary SOAP response contains a header and body within a SOAP envelope. The exemplary SOAP response includes <wsa:MessageID> header element which uniquely identifies the message. The wsu:Id attribute of the <messageID> element is MessageID-02, indicating that the <messageID> element may be referenced by the name "MessageID-02."

The <wsa:From> header block element in the exemplary SOAP response identifies the sender of the message. The sender of the response is Reponder-01. The wsu:Id attribute of <from> element is From-02 and therefore may be referenced by the name "From-02."

The <wsa:To> header element in the exemplary SOAP response identifies the destination of the message, the initial sender. The wsu:Id attribute of <to> element is To-02 and therefore the element may be referenced by the name "To-02."

The <wsa:RelatesTo> header block element identifies a message for which this message is a response. This SOAP response relates to the message with <messageID> "Message-01," the exemplary SOAP request given above. The value of the RelationshipType attribute is AcknowledgementMessage, indicating that this SOAP response is an acknowledgement of the above SOAP request.

The <xyz:ReceiptAcknowledgement> element implements an acknowledgement of a SOAP request. The <receiptAcknowledgement> element contains a <relatesTo> element which identifies the request for which this response is a receipt acknowledgement. This SOAP response relates to the message with <messageID> "Message-01," the exemplary SOAP request above. The <receiptAcknowledgement> element also contains a <ds:SignatureValue> element which contains the value of the signature of the SOAP message for which this message is a receipt acknowledgement. The value of the element is the same as the value of the signature of the PMO in the SOAP request above.

The <soap:Body> element of the SOAP response contains the body of the SOAP response. The wsu:Id attribute of the <body> element is Body-02, indicating that the <body> element may be referenced by the name "Body-02." Within the <body> element is the actual substance of the response, contained in the element named <ResponseBody>.

The <header> element of the exemplary SOAP response contains a <wsse:Security> element which contains security information. The only element shown within the <security> element is <ds:Signature>, a SOAP implementation of a digital signature used to sign elements of the PMR. One subelement of the <signedInfo> element is the <ds:Reference> element. The URI attribute of the <reference> element specifies the name of an element referenced by the signature and therefore under the signature.

The first <reference> element specifies an element named "From-02," the <from> element in this SOAP message. The second <reference> element of the <signedInfo> element of the <signature> element refers to the element with the name "To-02," the <to> element of the SOAP message. The third <reference> element refers to the element with the name "MessageID-02," the <messageID> element of the SOAP message. The fourth <reference> element refers to the element with the name "ReceiptAcknowledgement-01," the <ReceiptAcknowledgement> element of the SOAP response. The fifth <reference> element refers to the element with the name "Body-02," the <body> element of the SOAP message.

The <ds:SignatureValue> indicates the value of the signature. The value is obtained by digesting or hashing and then encrypting the elements that were signed, the elements referred to with the <reference> elements. In this case, the value of the digest or hash is obtained by combining and digesting the <from>, <to>, <messageID>, <ReceiptAcknowledgement>, and <body> elements of the SOAP response, producing the value KpRyejY4uxwT9I74FYv8nQ. That value is then encrypted to produce the value of the signature, "LyLsF0Pi4wPU."

The SOAP response illustrated in this example includes a PMR implemented as a collection of elements signed by the ultimate recipient web service. This exemplary PMR contains <from>, <to>, <messageID>, <ReceiptAcknowledgement>, and <body> elements each signed by the ultimate recipient web service.

Exemplary embodiments of the present invention are described largely in the context of a fully functional computer system for generating evidence of web services transactions. Readers of skill in the art will recognize, however, that the present invention also may be embodied in a computer program product disposed on a computer readable recordable media for use with any suitable data processing system. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for generating evidence of web services transactions, the method comprising steps performed by executing, by a computer processor, computer programming instructions stored in a recordable medium, the steps comprising:
    receiving in an ultimate recipient web service from an initial sender a request, the request containing a proof of message origin ('PMO'), the PMO containing an element addressed to the ultimate recipient web service, the element bearing a first signature of the initial sender, the first signature having a value, wherein the PMO contains a signed message identification element addressed to an ultimate recipient and a signed body element addressed to the ultimate recipient;
    authenticating the identity of the initial sender; and creating, by the ultimate recipient web service, a proof of message receipt ('PMR') including signing the value of the first signature, wherein creating a PMR further comprises:
    creating a receipt acknowledgement element;
    inserting the value of the first signature in the receipt acknowledgement element; and
    signing the value of the first signature further comprises signing the receipt acknowledgement element.

2. The method of claim 1 further comprising sending the PMR to the initial sender.

3. The method of claim 2 further comprising receiving, by the initial sender, the PMR and saving, by the initial sender, the PMR.

4. The method of claim 1 further comprising saving the PMO.

5. The method of claim 1 wherein creating a PMR includes associating the PMR with the PMO.

6. The method of claim 1 further comprising verifying the integrity of a body of the request.

7. The method of claim 1 further comprising saving the PMR.

8. A system for generating evidence of web services transactions, the system comprising a computer processor and computer memory, the computer memory operatively coupled to the computer processor, the computer memory containing computer program instructions capable of:
    receiving in an ultimate recipient web service from an initial sender a request, the request containing a proof of message origin ('PMO'), the PMO containing an element addressed to the ultimate recipient web service, the element bearing a first signature of the initial sender, the first signature having a value, wherein the PMO contains a signed message identification element addressed to an ultimate recipient and a signed body element addressed to the ultimate recipient;
    authenticating the identity of the initial sender;
    creating, by the ultimate recipient web service, a proof of message receipt ('PMR') including signing the value of the first signature;

creating a receipt acknowledgement element;
inserting the value of the first signature in the receipt acknowledgement element; and
signing the value of the first signature further comprises signing the receipt acknowledgement element.

9. The system of claim 8 further comprising computer program instructions capable of sending the PMR to the initial sender.

10. The system of claim 8, further comprising computer program instructions capable of saving the PMO.

11. The system of claim 8 further comprising computer program instructions capable of verifying the integrity of a body of the request.

12. A computer program product for generating evidence of web services transactions, the computer program product comprising: a non-transitory computer readable recordable medium; means, the means comprising computer executable code and recorded on the recordable medium, for receiving in an ultimate recipient web service from an initial sender a request, the request containing a proof of message origin ('PMO'), the PMO containing an element addressed to the ultimate recipient web service, the element bearing a first signature of the initial sender, the first signature having a value, wherein the PMO contains a signed message identification element addressed to an ultimate recipient and a signed body element addressed to the ultimate recipient;

means, the means comprising computer executable code and recorded on the recordable medium, for authenticating the identity of the initial sender; and means, the means comprising computer executable code and recorded on the recordable medium, for creating, by the ultimate recipient web service, a proof of message receipt ('PMR') including signing the value of the first signature: wherein means, the means comprising computer executable code and recorded on the recordable medium, for creating a PMR further comprises:

means, the means comprising computer executable code and recorded on the recordable medium, for creating a receipt acknowledgement element;

means, the means comprising computer executable code and recorded on the recordable medium, for inserting the value of the first signature in the receipt acknowledgement element; and means, the means comprising computer executable code and recorded on the recordable medium, for signing the value of the first signature further comprises means, recorded on the recordable medium, for signing the receipt acknowledgement element.

13. The computer program product of claim 12, further comprising means, the means comprising computer executable code and recorded on the recordable medium, for sending the PMR to the initial sender.

14. The computer program product of claim 12 further comprising means, the means comprising computer executable code and recorded on the recordable medium, for saving the PMO.

15. The computer program product of claim 12 further comprising means, the means comprising computer executable code and recorded on the recordable medium, for verifying the integrity of a body of the request.

16. The computer program product of claim 12 further comprising means, the means comprising computer executable code and recorded on the recordable medium, for saving the PMR.

* * * * *